United States Patent Office 3,067,094
Patented Dec. 4, 1962

---

3,067,094
COMPOSITION FOR PRESERVING FEATHERS
Morris R. Rogers, Framingham, Arthur M. Kaplan, Newton, and George Cohen, Framingham, Mass., assignors to the United States of America as represented by the Secretary of the Army
No Drawing. Filed Feb. 1, 1961, Ser. No. 86,559
4 Claims. (Cl. 167—31)
(Granted under Title 35, U.S. Code (1952), sec. 266)

The invention described herein, if patented, may be manufactured and used by or for the Government for governmental purposes, without the payment to us of any royalty thereon.

This invention concerns a process of preserving feathers, whereby they are protected against microbiological attack and against loss of filling power even after prolonged storage and repeated wettings.

Fowl feathers, of land as well as water fowl origin, are delicate substances, characterized by a high surface to weight ratio. As such, they are highly susceptible to microbiological attack, and quickly deteriorate in storage. Conventional sterilization procedures afford but little protection, as a sterilized feather in a non-sterile surrounding will be quickly attacked by micro-organisms which degrade the feather protein. As a result, the attacked feathers acquire a musty odor and yellow discoloration, and progressively lose their filling power and resiliency.

"Filling power" of feathers is a measure of their capacity to counteract gentle compression (it is expressed in terms of the height in cm. of a column of feathers compressed by a predetermined light weight in a measuring cylinder). Reference may be made in this connection to a report entitled "A Proposed Method for Measuring the Filling Power of Down and Feathers," by Henry A. Sinski, Publication No. TD 103037, The Office of Technical Services, Department of Commerce, and to the article by N. B. Edelman in Textile Research Journal, vol. 17, page 199 (April 1947), entitled "Investigation of Methods for Determining the Filling Power of Feathers"; see also Sinski et al., Patent No. 2,706,910, dated April 26, 1955.

We have discovered, surprisingly, that feathers are permanently preserved by imersion in a dilute aqueous solution of sodium-o-phenyl phenolate and an isomeric mixture of sodium-4-chloro-2-phenylphenolate and sodium-6-chloro-2-phenylphenolate.

Numerous trials have shown that the proportion of sodium-o-phenylphenolate to sodium-chloro-phenylphenolates must be about 5 to 30 parts by weight of sodium-o-phenyl-phenolate to about 95 to 70 parts by weight of the aggregate amount of sodium-4-chloro-2-phenylphenolate and sodium-6-chloro-2-phenyl-phenolate.

A preferred proportionate range of phenolates for preparing a feather-treating solution in accordance with our invention is as follows:

Table I

| | Parts by weight (anhydrous), about— |
|---|---|
| Sodium-o-phenylphenolate | 5–30 (e.g. 20) |
| Sodium-4-chloro-2-phenylphenolate | 40–80 (e.g. 60) |
| Sodium-6-chloro-2-phenylphenolate | 10–30 (e.g. 20) |
| | 100 | in a concentration of about 100–2000 p.p.m. in water.

Length of immersion in the solution of Table I may vary according to the type of feathers; about 10–45 (say 15) minutes are suitable. A longer period of immersion is quite permissable, but does not ordinarily confer additional protection. The water temperature may be room temperature or slightly higher, say 100° F.

A conventional feather-treating souring agent, such as sodium silico fluoride may be added to the feather treating bath which contains our synergistic mixture of phenolates, e.g., in a proportion of 22.4 grams of sodium silico fluoride per gallon of water. This imparts a final pH of about 4–5 to the solution.

Finally the feathers are rinsed, and dried at a suitable non-injurious temperature, say about 130° F.

A conventional washing procedure to remove dirt, blood and other foreign matter customarily found on unwashed feathers should preferably precede treatment in accordance with our invention. Such a procedure may advantageously consist of washing of the feathers in a solution of sufficient alkali such as trisodium phosphate in a proportion of approximately 1 ounce per ten gallons and non-ionic detergent in approximately the same proportion. The feathers are agitated in this solution for approximately ten minutes, drained and rinsed.

Our experiments have shown that duck feathers treated with an aqueous solution of 2000 p.p.m. of sodium orthophenyl phenolate, alone, showed a distinct yellowing under tropical (hot and humid) storage conditions of two months duration, which is a clear sign of microbiologically caused deterioration. The same observation was made on duck feathers treated with an aqueous solution containing 2000 p.p.m. of an isomeric mixture of sodium-4-chloro-2-phenylphenolate and sodium-6-chloro-2-phenylphenolate. On the other hand, duck feathers treated with the synergistic solution set forth in Table I showed no yellowing after 14 months' tropical storage, which demonstrates their resistance to microbiological attack.

The filling power of duck feathers treated with our solution as described in Table I, was compared with the filling power of washed untreated duck feathers exposed to the same tropical storage conditions, and it was found that the feathers treated in accordance with our invention had a filling power of 4.8 cm. after 3 months' storage, as compared with a filling power of 4 cm. for the untreated feathers after 3 months' storage. Prior to initiation of the storage, the feathers that were treated in accordance with our invention had a filling power of 4.9 cm., and the untreated duck feathers had a filling power of 4.4 cm. This shows that the untreated feathers lost about 10% of their filling power, while the filling power of the treated feathers remained virtually unchanged.

After seven months' tropical storage, the filling power of the untreated washed duck feathers had dropped to 0 cm., indicating complete degradation, while the filling power of the feathers treated in accordance with our invention was still 4.1 cm., which is sufficiently high to be considered useful for military purposes.

It will thus be seen that we have discovered a simple and reliable method for preserving feathers which enables them to withstand prolonged storage under severe conditions. Feathers preserved in accordance with our invention may be subjected to repeated wettings (rain-soaking, laundering, etc.) without losing their resistance against microbiological attack. While we have shown a preferred way of carrying our invention into practice, it will be understood that modifications of the specific conditions may be made without departing from the spirit and scope of our invention. We therefore proceed to define our invention by the appended claims.

We claim:

1. Composition for preserving and sterilizing feathers so as to protect them against microbiological attack and against loss of filling power even after prolonged periods of storage and repeated wettings, said composition being a dilute aqueous solution of a mixture of

| | Parts by weight (anhydrous), about— |
|---|---|
| Sodium-o-phenylphenolate | 5–30 |
| A mixture of sodium-4-chloro-2-phenylphenolate and sodium-6-chloro-2-phenylphenolate | 95–70 | the pH of said solution being adjusted to about 4–5 by the addition of sodium silico fluoride.

2. Composition according to claim 1, wherein the concentration of said sodium phenylphenolates in said solution is about 100–2000 p.p.m.

3. Composition for preserving and sterilizing feathers so as to protect them against microbiological attack and against loss of filling power even after prolonged periods of storage, and repeated wettings, said composition being a dilute aqueous solution of a mixture of

| | Parts by weight (anhydrous), about— |
|---|---|
| Sodium-o-phenylphenolate | 5–30 |
| Sodium-4-chloro-2-phenylphenolate | 40–80 |
| Sodium-6-chloro-2-phenylphenolate | 10–30 | the pH of said solution being adjusted to about 4–5 by the addition of sodium silico fluoride.

4. Composition according to claim 3, wherein the concentration of said sodium phenylphenolates in said solution is about 100–2000 p.p.m.

References Cited in the file of this patent

UNITED STATES PATENTS

| 1,907,728 | Britton | May 9, 1933 |
| 2,821,456 | Frederick | Jan. 28, 1958 |
| 3,002,883 | Butt et al. | Oct. 3, 1961 |